(12) United States Patent
Park et al.

(10) Patent No.: US 8,040,365 B2
(45) Date of Patent: Oct. 18, 2011

(54) IMAGE FORMING APPARATUS AND CONTROL METHOD THEREOF

(75) Inventors: Kyoung-sik Park, Seoul (KR); Young-jin Park, Bucheon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1080 days.

(21) Appl. No.: 11/831,201

(22) Filed: Jul. 31, 2007

(65) Prior Publication Data

US 2008/0152398 A1 Jun. 26, 2008

(30) Foreign Application Priority Data

Dec. 20, 2006 (KR) .................. 10-2006-0130916

(51) Int. Cl.
*B41J 2/385* (2006.01)
*G01D 15/06* (2006.01)
*G03G 15/01* (2006.01)

(52) U.S. Cl. ........ 347/116; 347/111; 347/112; 347/115; 347/153; 347/154; 399/297; 399/298; 399/299; 399/301; 399/302; 399/303

(58) Field of Classification Search .................. 347/116, 347/117; 399/301, 302, 303
See application file for complete search history.

(56) References Cited

U.S. PATENT DOCUMENTS

| | | | |
|---|---|---|---|
| 4,916,547 | A | 4/1990 | Katsumata et al. |
| 5,499,092 | A | 3/1996 | Sasaki |
| 5,541,708 | A | 7/1996 | Tsuruoka |
| 6,167,217 | A | 12/2000 | Kelsch et al. |
| 6,300,968 | B1 | 10/2001 | Kerxhalli et al. |
| 6,644,773 | B2 * | 11/2003 | Bildstein et al. ............... 347/19 |
| 2001/0004425 | A1 | 6/2001 | Shinohara et al. |
| 2002/0113968 | A1 * | 8/2002 | Parisi et al. ................... 356/399 |
| 2003/0142988 | A1 * | 7/2003 | Kimura ........................... 399/49 |
| 2005/0207768 | A1 * | 9/2005 | Suzuki ........................... 399/49 |

FOREIGN PATENT DOCUMENTS

| | | |
|---|---|---|
| EP | 1286256 | 2/2003 |
| JP | 2004-252573 | 9/2004 |
| KR | 2005-73182 | 7/2005 |
| KR | 2006-8819 | 1/2006 |

OTHER PUBLICATIONS

European Search Report issued Oct. 1, 2009 in EP Application No. 07123503.0.

* cited by examiner

*Primary Examiner* — Ryan Lepisto
(74) *Attorney, Agent, or Firm* — Stanzione & Kim, LLP

(57) ABSTRACT

An image forming apparatus includes a transport part which includes a transport belt to transport a printing medium, an image forming part which transfers a toner to form a color image, and a controller which controls the image forming part to form a test image for color registration of the image forming part on the transport belt while an image is formed for a plurality of printing media. Thus, both a test image and a plurality of printed media are formed during a single printing process.

21 Claims, 7 Drawing Sheets

IMAGE FORMING APPARATUS AND CONTROL METHOD THEREOF

CROSS-REFERENCE TO RELATED APPLICATIONS

This application claims priority from Korean Patent Application No. 10-2006-0130916, filed on Dec. 20, 2006 in the Korean Intellectual Property Office, the disclosure of which is incorporated herein by reference.

BACKGROUND OF THE INVENTION

1. Field of the Invention

Apparatuses and methods consistent with the present general inventive concept relate to an image forming apparatus and a control method thereof, and more particularly, to an image forming apparatus which performs an improved color registration process using a test image and a control method thereof.

2. Description of the Related Art

An image forming apparatus such as a laser printer exposes a photosensitive member, develops a toner, and transfers and fuses the toner to a printing medium such as a paper, thereby forming an image.

Generally, an image forming apparatus to form a color image includes an image forming part which has a laser scanning unit (LSU) provided corresponding to a plurality of colors, and a plurality of photosensitive members and transfer rollers, etc. The plurality of photosensitive members are arranged along a transport path of a printing medium transported by a transporting means such as a transporting belt.

The image forming apparatus forms an image for color registration (hereinafter, referred to as a test image) other than an actual image in order to adjust an image forming characteristic (hereinafter, referred to as color registration) of the image forming part, e.g., determination of a developing condition, color registration, etc.

Conventionally, the color registration is performed in an initializing process when the image forming apparatus is provided with power or after the predetermined number of papers is printed.

In the color registration, an image of data is not printed (hereinafter, referred to as printing data). Rather, a test image is formed. The test image is not formed during a printing process for the printing data, but is formed during the aforementioned initializing process before start of the printing process or after completion of a predetermined number of the printing process.

Thus, a lengthy period of time transpires from when the image forming apparatus is supplied with power until a first printing output is obtained (hereinafter, referred to as a first page output time). In other words, the time to obtain a printing output is delayed.

Further, if the color registration is performed separately from the printing process, a color discordance occurring in the actual printing process may not be properly reflected on the color registration.

SUMMARY OF THE INVENTION

The present general inventive concept provides an image forming apparatus which has an improved printing speed by minimizing delay due to color registration and a control method thereof.

The present general inventive concept also provides an image forming apparatus which improves accuracy and reliability of color registration by reflecting a color discordance which may be generated in a printing process and a control method thereof.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept can be achieved by providing an image forming apparatus comprising: a transport part which comprises a transport belt to transport a printing medium; an image forming part which transfers a toner to form a color image; and a controller which controls the image forming part to form a test image for color registration of the image forming part on the transport belt while an image is formed for a plurality of printing media corresponding to a single printing process.

The image forming part may comprise: an engine which performs an exposure process for the toner to be developed and transferred; a video controller which generates video data based on printing data corresponding to the image being formed on the printing medium or test data corresponding to the test image; and an engine controller which operates the engine on the basis of the video data generated by the video controller.

The engine controller may comprise: an auto color registration (ACR) controller which performs the color registration of the image forming part according to a result of sensing the test image.

The image forming apparatus may further comprise a data storage part which stores the test data, wherein the video controller reads out the test data stored in the data storage part through direct memory access (DMA).

The data storage part may further store the printing data.

The foregoing and/or other aspects and utilities of the present general inventive concept can also be achieved by providing an image forming apparatus comprising: an engine which transfers a toner to form a color image; a video controller which generates video data; an engine controller which operates the engine according to the video data generated by the video controller; and a controller which controls the video controller to generate video data based on printing data or test data by determining whether to perform a printing process to form an image on a printing medium or to perform color registration of the engine.

The engine controller may comprise an auto color registration (ACR) controller which performs the color registration of the engine according to a result of sensing the test image formed corresponding to the test data.

The image forming apparatus may further comprise a data storage part which stores the test data, wherein the video controller reads out the test data stored in the data storage part through direct memory access (DMA).

The data storage part may further store the printing data.

The foregoing and/or other aspects and utilities of the present general inventive concept can also be achieved by providing a control method of an image forming apparatus which comprises a transport part having a transport belt to transport a printing medium and an image forming part to transfer a toner to form a color image, the control method comprising: controlling the image forming part to form an image on a first printing medium among the plurality of printing media corresponding to a single printing process; controlling the image forming part to form a test image for color registration of the image forming part on the transport belt after forming the image for the first printing medium; and controlling the image forming part to form an image on a second printing medium among the plurality of the printing media after forming the test image.

The image forming part may comprise an engine which performs an exposure process for a toner to be developed and transferred; a video controller which generates video data; and an engine controller which operates the engine according to the video data generated by the video controller, the controlling the image forming part to form the image on the first printing medium, the transport belt and the second printing medium comprising controlling the video controller to generate video data based on printing data or test data for color registration by determining whether the image forming part performs the printing process to form the image on the printing medium or the color registration.

The engine controller may comprise an auto color registration (ACR) controller which performs the color registration of the image forming part, the control method may further comprise controlling the ACR controller to perform the color registration of the image forming part according to a result of sensing the test image.

The image forming apparatus may further comprise a data storage part which stores the test data, the controlling the image forming part to form the test image comprising controlling the video controller to read out the test data stored in the data storage part through direct memory access (DMA).

The data storage part may further store the printing data, the controlling the image forming part to form the image on the first printing medium and the second printing medium comprising controlling the video controller to read out the printing data stored in the data storage part through direct memory access (DMA).

The foregoing and/or other aspects and utilities of the present general inventive concept can also be achieved by providing a control method of an image forming apparatus which comprises an engine to transfer a toner to form a color image, a video controller to generate video data and an engine controller to operate the engine according to the video data generated by the video controller, the control method comprising: determining whether to perform a printing process to form an image on a printing medium or to perform color registration of the engine; and controlling the video controller to generate video data based on printing data or test data respectively corresponding to the determined printing process or color registration.

The engine controller may comprise an auto color registration (ACR) controller which performs the color registration of the engine, the control method may further comprise controlling the auto color registration controller to perform the color registration of the engine according to a result of sensing the test image formed corresponding to the test data.

The image forming apparatus may further comprise a data storage part which stores the test data, the controlling the video controller to generate the video data may comprise controlling the video controller to read out the test data stored in the data storage part through direct memory access (DMA).

The data storage part may further store the printing data, the controlling the video controller to generate the video data comprising controlling the video controller to read out the printing data stored in the data storage part through direct memory access (DMA).

The foregoing and/or other aspects and utilities of the present general inventive concept can also be achieved by providing an image forming apparatus comprising an image forming part which forms a color image for a plurality of printing media, and a controller which controls the image forming part during a printing process to form a test image for color registration after forming an image on a first printing medium and before forming another image on a second printing medium.

The image forming apparatus may further comprise a controller which outputs a control signal to form the test image within an idle time during the printing process.

The image forming apparatus may further comprise an engine which performs an exposure process for a toner to be developed and transferred; a video controller which generates video data based on printing data corresponding to the image being formed on one of the plurality of printing media or test data corresponding to the test image; and an engine controller which operates the engine based on video data generated by the video controller.

The image forming apparatus may further comprise the video controller, wherein the video controller reads out the test data stored in a data storage part during the printing process.

The image forming apparatus may further comprise the video controller, wherein the image forming part forms the test image for color registration during the first printing medium output time during the printing process.

The engine controller may further perform the color registration during the printing process.

BRIEF DESCRIPTION OF THE DRAWINGS

These and/or other aspects and utilities of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Figure 1:
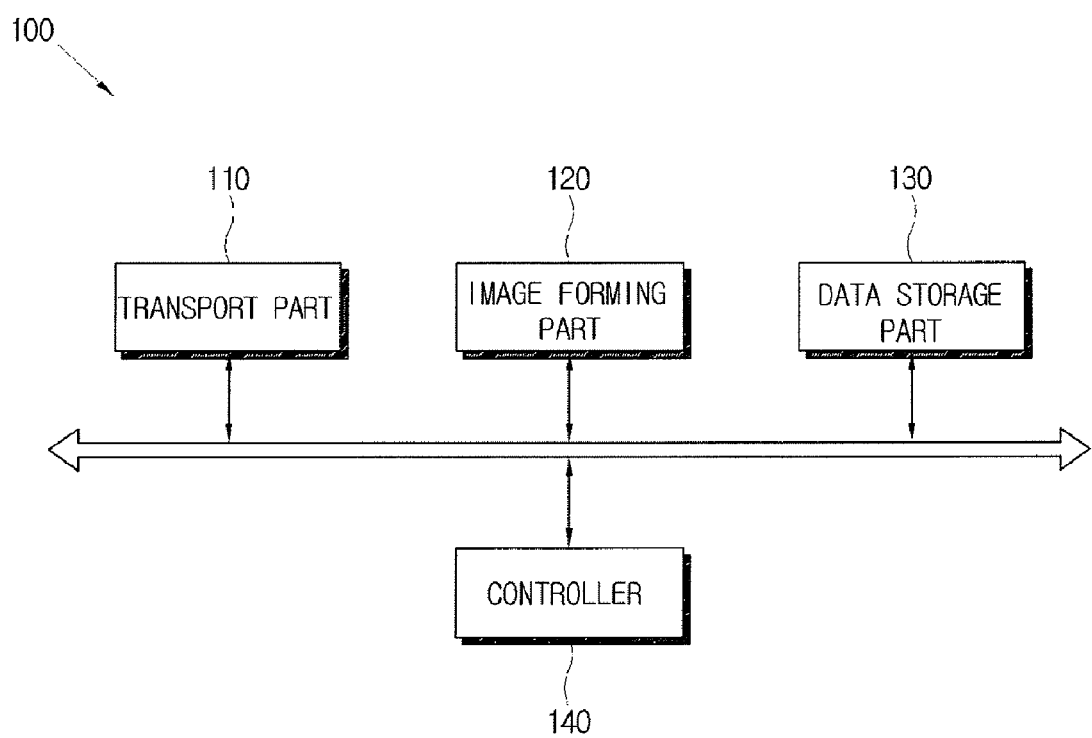
FIG. 1 is a block diagram to illustrate a configuration of an image forming apparatus according to an exemplary embodiment of the present general inventive concept.

Reference will now be made in detail to the embodiments of the present general inventive concept, examples of which are illustrated in the accompanying drawings, wherein reference numerals refer to their associated respective elements throughout. The exemplary embodiments are described below in order to explain the present general inventive concept by referring to the figures.

FIG. 1 is a block diagram illustrating a configuration of an image forming apparatus 100 according to an exemplary embodiment of the present general inventive concept. The image forming apparatus 100 may be provided as a laser printer.

Referring to FIG. 1, the image forming apparatus 100 may include a transport part 110, an image forming part 120, a data storage part 130, and a controller 140.

Figure 2:
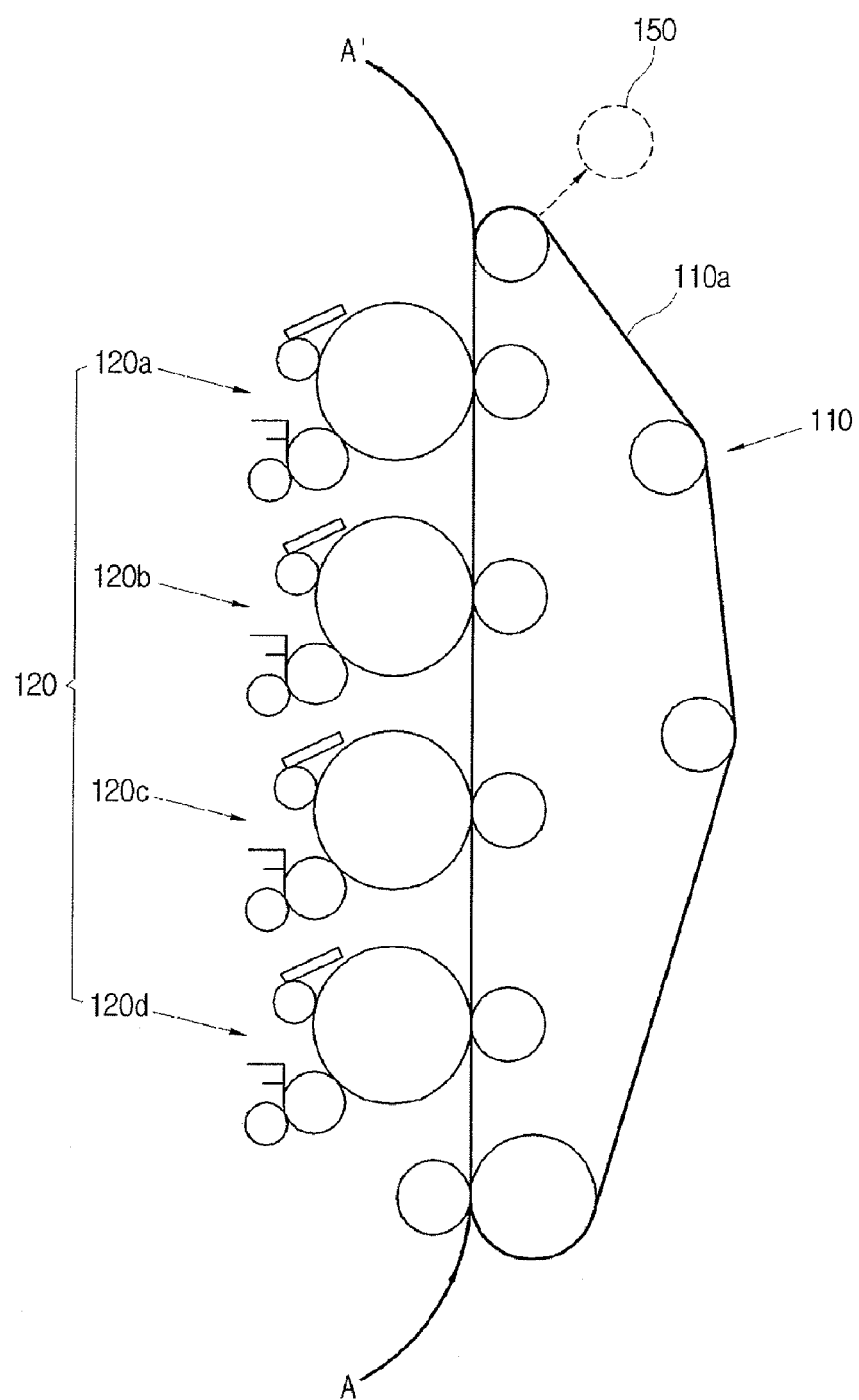
FIG. 2 is a cross-sectional view of a transport part according to an exemplary embodiment of the present general inventive concept.

The transport part 110 transports a printing medium, e.g., a paper, in accordance with control signals from the controller 140. FIG. 2 is a cross-sectional view of the transport part 110 according to the exemplary embodiment of FIG. 1. The transport part 110 may include a transport belt 110a, and transports a printing medium (not illustrated) by moving the transport belt 110a. Referring to FIG. 2, the transport belt 110a transports the printing medium in a direction from A to A', which is referred to as a printing medium transport path. Thus, the transport belt 110a movement corresponds to the printing medium transport path.

The image forming part 120 can form an image by transferring a toner to the printing medium according to printing data. Referring to FIG. 2, the image forming part 120 may include four sub-image forming parts 120a, 120b, 120c, and 120d to correspond to respective colors such as cyan, magenta, yellow and black, respectively. The sub-image forming parts 120a, 120b, 120c and 120d each can perform exposure, development and transfer according to the printing data.

The image forming part 120 can form a test image for a color registration in accordance with control signals from the controller 140. The test image is formed on a surface portion (not illustrated) of the transport belt 110a based on test data. The test image may be formed to correspond to each of the sub-image forming parts 120a, 120b, 120c and 120d. For example, the test image may be formed as a sign or a letter.

Referring to FIG. 2, the image forming apparatus 100 may further include a sensor 150 which is provided on a path where the transport belt 110a moves and senses light reflected to the test image. A result sensed by the sensor 150 is delivered to the controller 140, and can be used for the color registration.

The image forming apparatus 100 may further include a data storage part 130 which stores printing data to be printed and test data to correspond to a test image. The image forming part 120 reads the printing data and the test data in the data storage part 130 and performs a printing process and a color registration based on the printing data and the test data.

The controller 140 controls the overall image forming apparatus 100. The controller 140 controls the image forming part 120 to form an image on a printing medium on the basis of the printing data. In addition, the controller 140 controls the image forming part 120 to form a test image on the transport belt 110a on the basis of the test data. In detail, the controller 140 controls the image forming part 120 to form the test image while forming the image on a plurality of printing media in one printing process.

Figure 3:
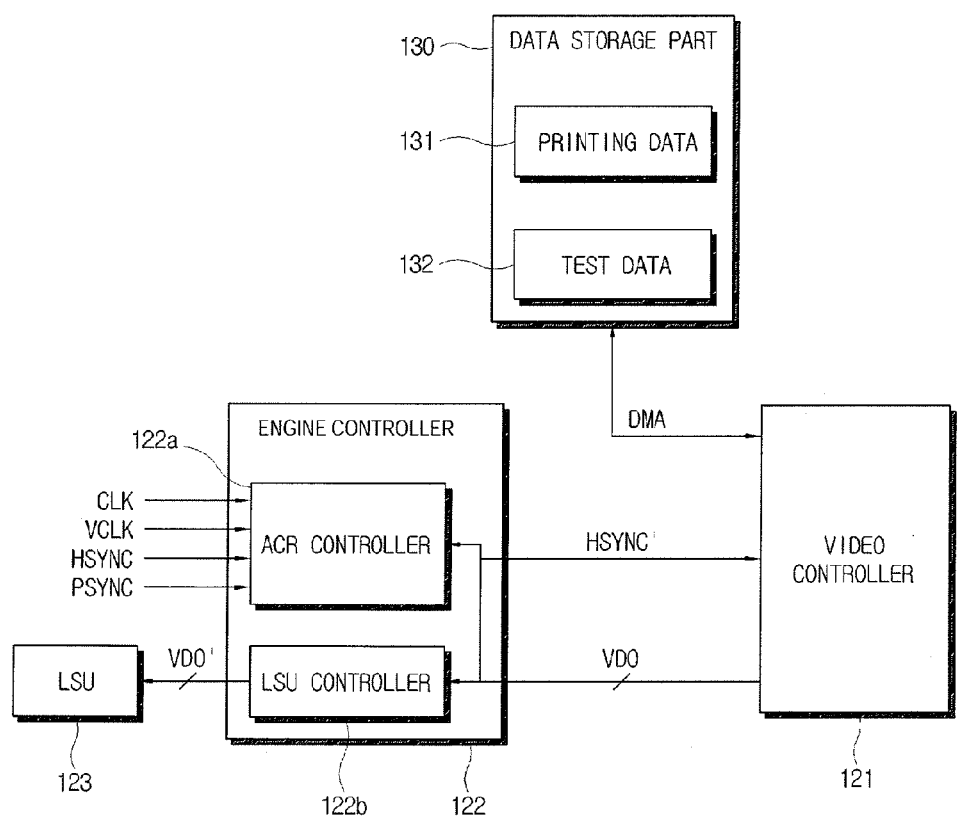
FIG. 3 is a block diagram illustrating a configuration of an image forming part according to an exemplary embodiment of the present general inventive concept.

FIG. 3 is a block diagram illustrating a configuration of the image forming part 120 according to the present exemplary embodiment. The image forming part 120 may further include a video controller 121, an engine controller 122 and a laser scanning unit (LSU) 123. The video controller 121 and the engine controller 122 may be provided as a chip on a printed circuit board (PCB) (not illustrated).

The data storage part 130 stores printing data 131 to be printed and test data 132 corresponding to a test image for a color registration. The data storage part 130 may be provided as a synchronous dynamic random access memory (SDRAM), a read only memory (ROM), and other well known memory devices.

The video controller 121 receives the printing data 131 or the test data 132 through direct memory access (DMA) to generate video data (VDO).

The engine controller 122 may include an auto color registration (ACR) controller 122a and an LSU controller 122b. The test image obtained by the sensor 150 from the controller 140 is transmitted to the ACR controller 122a, whereby it performs the color registration. The color registration is applied to a printing process immediately following the sensing of the test image.

The LSU controller 122b converts video data (VDO) generated by the video controller 121 into output video data (VDO') to the LSU 123 in order to drive the LSU 123.

The Laser Scanning Unit (LSU) 123 scans the laser at a plurality of photosensitive members (not illustrated) provided in the sub-image forming parts 120a, 120b, 120c and 120d according to the output video data (VDO') to form a latent image, thereby performing an exposure. A combination of the sub-image forming parts 120a, 120b, 120c and 120d and the LSU 123 is provided as an example of an engine in the present exemplary embodiment.

Figure 4:
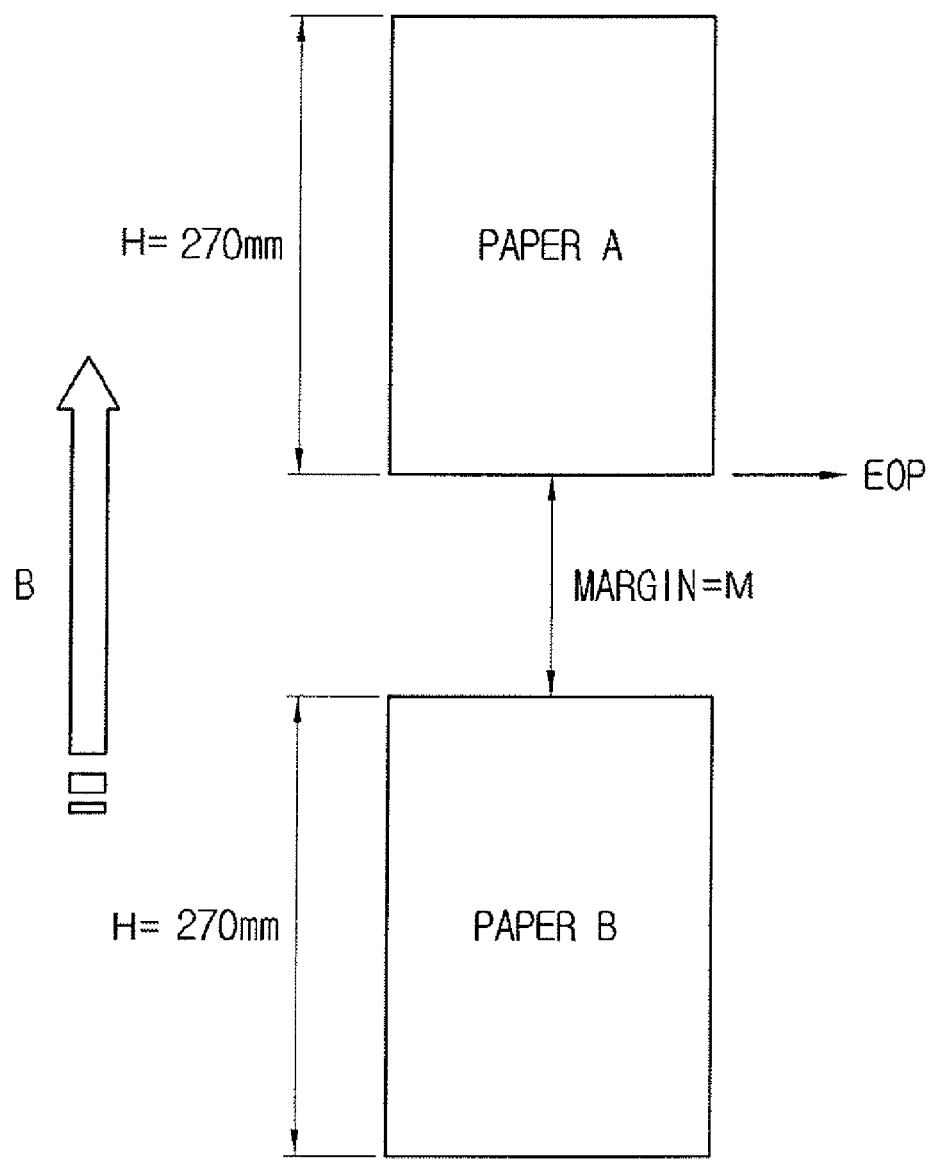
FIG. 4 illustrates a margin between two consecutive printing mediums in a printing process.

FIG. 4 illustrates a margin between two consecutive printing media (hereinafter, referred to as a paper) in one printing process. The transport belt 110a transports a paper A and a paper B in a direction of B in the printing process. If a printing speed is 60 pages per minute (ppm), a margin between the papers A and B may be set at about 30% of the height H of the paper. For example, the height H of the papers A and B is about 270 mm (A4), and the margin M between the papers is about 80 mm.

Figure 5:
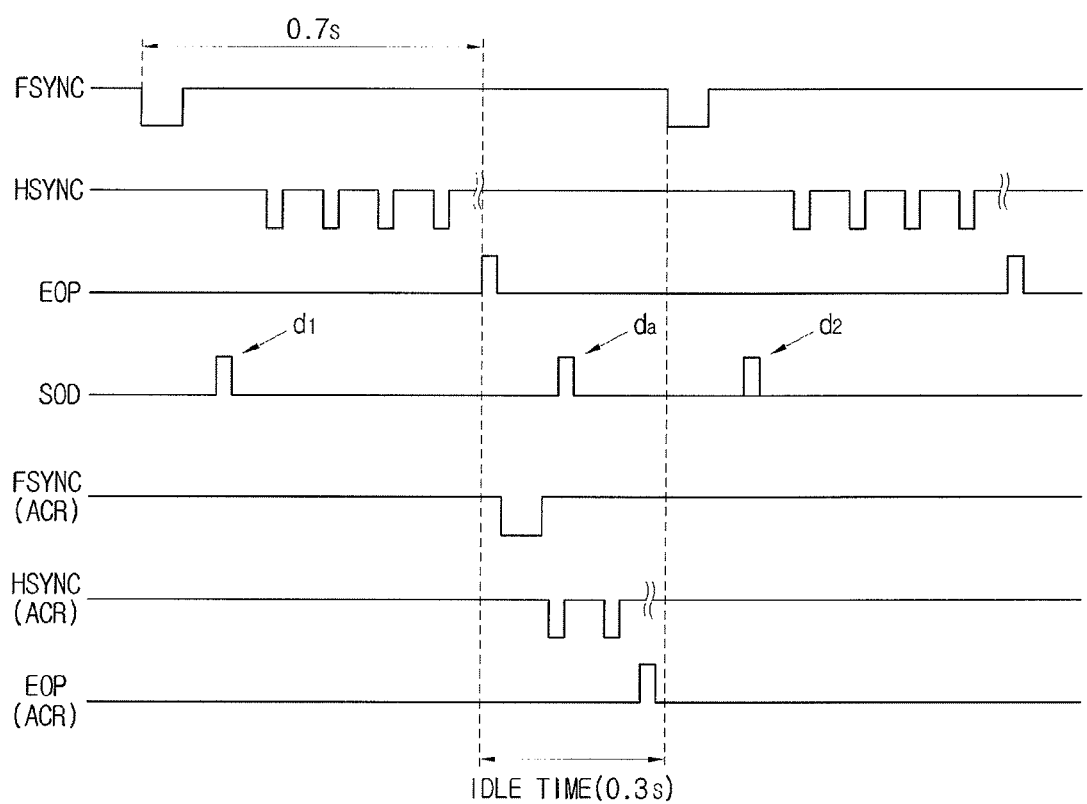
FIG. 5 is a timing diagram illustrating a control sequence of a controller according to an exemplary embodiment of the present general inventive concept.

FIG. 5 is a timing diagram illustrating a control sequence of the controller 140 according to an exemplary embodiment of the present general inventive concept. The controller 140 can generate a control signal which is output to the image forming part 120 so that the image forming part 120 can perform a printing process or form a test image.

Referring to FIG. 5, a control signal may include an FSYNC signal, an HSYNC signal, an SOD (Start Of Direct (Memory Access)) signal, an EOP (End Of Page) signal, an FSYNC (ACR) signal, an HSYNC (ACR) signal, an SOD (ACR) signal and an EOP (ACR) signal. In this case, the FSYNC signal, HSYNC signal, SOD signal, and EOP signal correspond to a printing process. Referring to FIG. 3, the control signal can be input to the video controller 121 via the engine controller 122.

The FSYNC signal indicates a start of a printing process, and the HSYNC indicates a horizontal synchronous signal. For example, if a printing speed is 60 ppm and A4 paper is provided, an interval between FSYNC signals is 1 second. After the FSYNC, printing is performed in a unit of the line according to the HSYNC.

The SOD signal indicates a start of direct memory access (DMA) to printing data. The video controller 121 starts DMA to the data storage part 130 by an SOD after the FSYNC and reads out printing data 131 stored in the data storage part 130.

Figure 6:
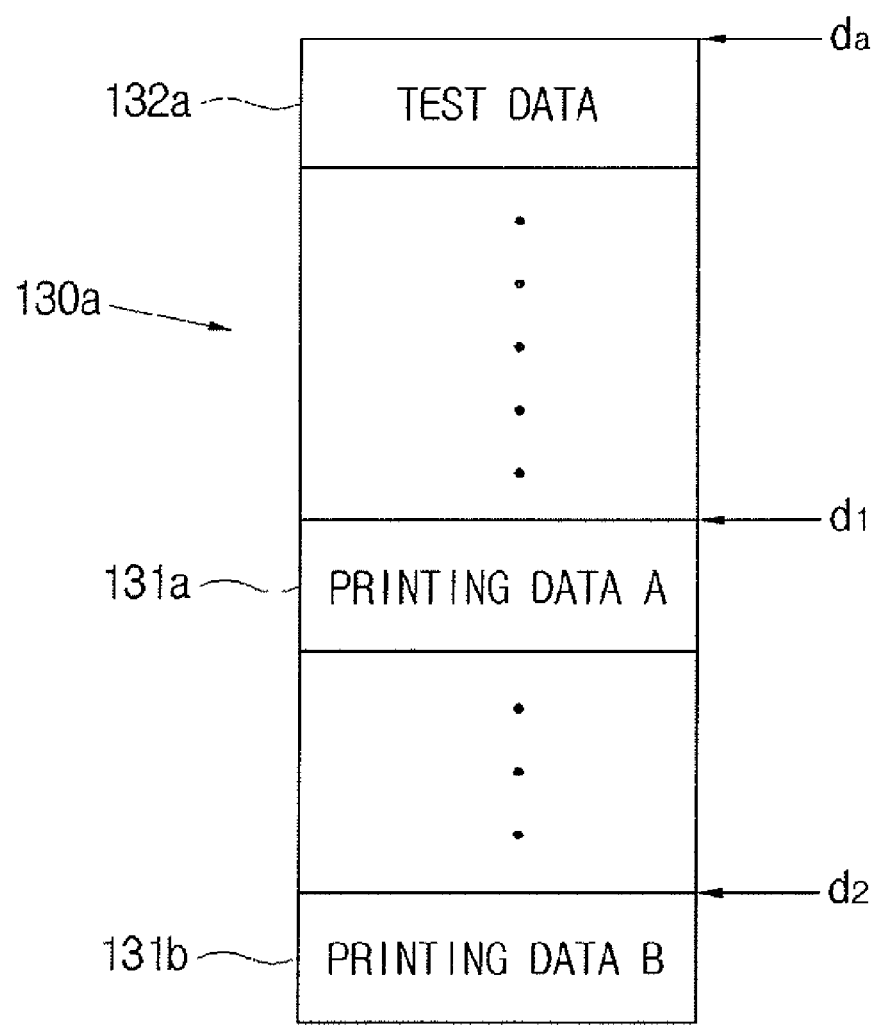
FIG. 6 illustrates a memory map of printing data and test data stored in a data storage part according to an exemplary embodiment of the present general inventive concept.

FIG. 6 illustrates a memory map 130a of printing data and test data stored in a data storage part 130 according to an exemplary embodiment of the present general inventive concept. If an SOD $d_1$ which indicates a start of DMA to printing data corresponding to the paper A is present after the FSYNC, the video controller 121 reads out printing data A 131a stored in the data storage part 130. Likewise, an SOD $d_2$ indicates start of DMA to printing data B 131b corresponding to the paper B.

After 0.7 seconds from the FSYNC, the printing on the paper A is completed by the EOP to indicate completion of printing. There is an interval of about 0.3 seconds from the EOP for the paper A to the FSYNC for the paper B, which is referred to as an idle time when printing is not practically performed.

In the present exemplary embodiment, the controller 140 outputs a control signal to the image forming part 120 to form a test image for color registration on the transport belt 110a within the idle time. Regarding the control signal, the FSYNC (ACR), HSYNC (ACR), SOD (ACR) and EOP (ACR) correspond to forming the test image.

The FSYNC (ACR) indicates the start of forming a test image and is generated right after the EOP for the paper A. During the idle time, a polygon mirror (illustrated) provided in the LSU 123 keeps its rotation state, and the HSYNC (ACR) is continually sensed. Thus, the video controller 121 reads out test data stored in the data storage part 130 through DMA in the idle time as well as during the printing process.

In detail, after the FSYNC, if an SOD $d_a$ which indicates start of DMA to test data is present, the video controller 121 reads out the test data 132a stored in the data storage part 130.

Then, the image forming part 120 completes forming a test image by an EOP (ACR) and starts printing paper B by a new FSYNC.

Provided that a period of an HSYNC is 450 µsec, a test image with 600 or more lines may be formed in the idle time of 0.3 seconds.

As described above, since the color registration is performed during the printing process, a first page output time (FPOT) is minimized, thereby improving printing speed. Also, as compared with the color registration which is performed periodically according to the accumulated number of printing papers, a delay time between processes is minimized.

Further, since the color registration can be performed under the same conditions as the printing process, a discordance which may be generated in the printing process is maximally reflected upon the color registration, thereby improving accuracy and reliability of the color registration.

Referring to FIG. 3, as the HSYNC is transmitted to the video controller 121 via the engine controller 122, timing delays may arise (refer to HSYNC' in FIG. 3), e.g., a gate delay in the engine controller 122 or a wire delay in the printed circuit board (PCB).

In a present exemplary embodiment, a timing delay element which is generated in video data VDO and VDO' is reflected on the color registration under the same conditions as the printing process. Thus, a comparatively accurate color registration as compared with the color registration can be performed independently from the printing process by the engine controller 122.

Also, since the video controller processes the test data to form the test image as well as the printing data, the ACR controller has a simple configuration and a reduced cost in comparison to an ACR controller having a separate configuration for processing test data.

Meanwhile, the test data, e.g., synchronous dynamic random access memory (SDRAM), can be stored in the data storage part and may be direct-memory accessed (DMA) by the video controller. Thus, various types of test images may be formed as compared with test data residing in the engine controller 122.

Figure 7:
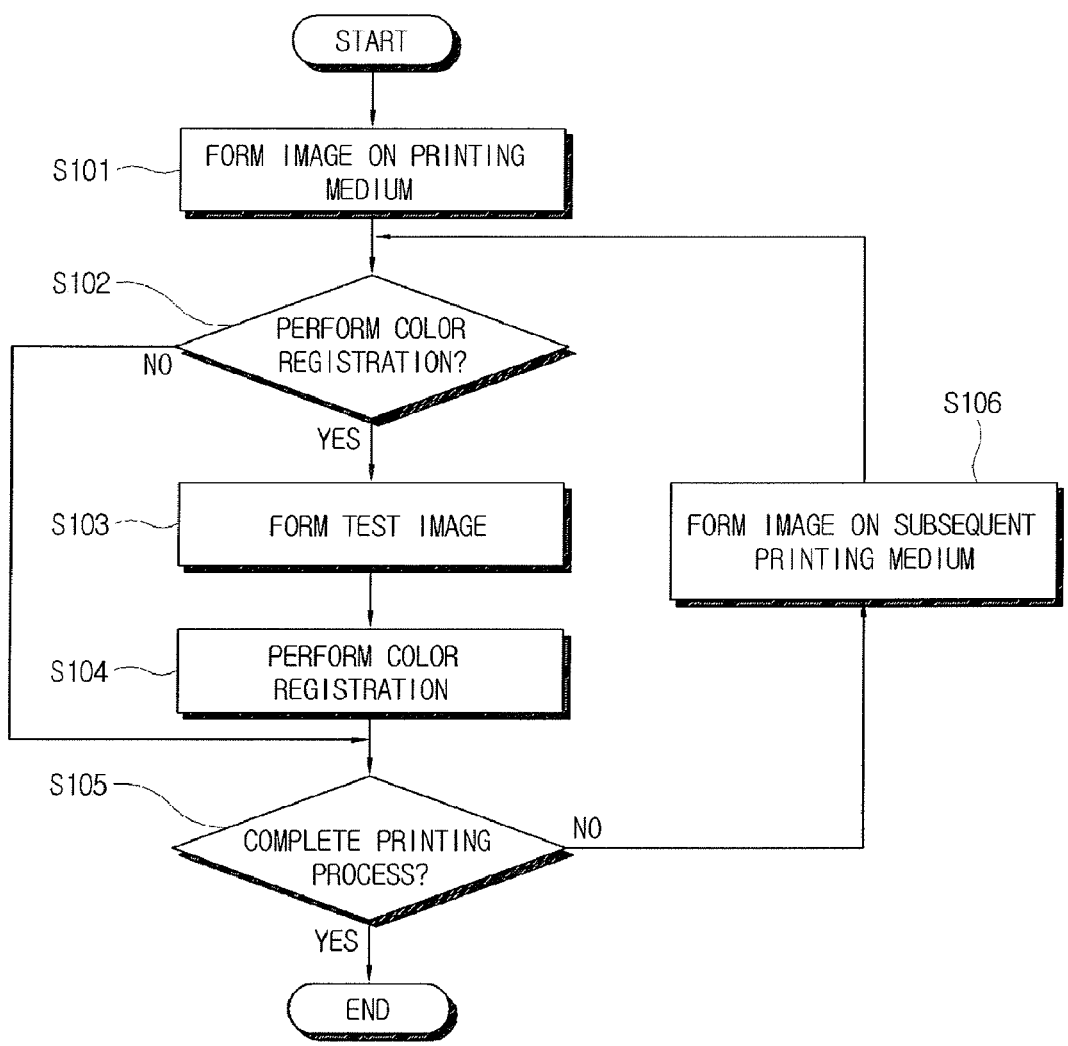
FIG. 7 is a flowchart illustrating an operation of the image forming apparatus according to an exemplary embodiment of the present general inventive concept.

FIG. 7 is a flowchart illustrating an operation of the image forming apparatus 100 according to an exemplary embodiment of the present general inventive concept. First, the controller 140 controls image forming part 120 to form an image on a first printing medium in a printing process which involves a plurality of printing media (operation S101). At operation S101, the controller 140 controls the video controller 121 to generate video data on the basis of printing data corresponding to the first printing medium.

The controller 140 determines whether to perform color registration of the image forming part 120 (operation S102). If it performs the color registration at operation S102, the controller 140 controls the image forming part 120 to form a test image on the transport belt 110a (operation S103).

In FIG. 7, at operation S103, the controller 140 may output a control signal to the image forming part 120 to form the test image within the idle time of the printing process. Further, the controller 140 may control the video controller 121 to generate video data on the basis of test data for the color registration.

The controller 140 controls the ACR controller 122a so that the image forming part 120 can perform the color registration according to a test image (operation S104) sensing result.

If operation S104 is performed or it is determined to not perform the color registration at operation S102, the controller 140 checks if the printing process for all printing media is completed (operation S105).

If the printing process for all the printing media is not completed, the controller 140 controls the image forming part 120 to form an image on a subsequent printing medium among the plurality of printing media (operation S106). Then, operations S102 through S106 are repeated.

According to the present general inventive concept, since the color registration is performed during the printing process, a first page output time (FPOT) is minimized to thereby improve a printing speed. Also, as compared with the color registration which is performed periodically according to the accumulation number of printing papers, delay time between processes is minimized.

Further, since the color registration is performed under the same condition as the printing process, a discordance which may be generated in the printing process is maximally reflected on the color registration, thereby improving accuracy and reliability of the color registration. A timing delay element which is generated in a video data is reflected upon the color registration under the same condition as the printing process, thereby performing comparatively accurate color registration.

Also, since the video controller processes the test data to form the test image as well as the printing data, the ACR controller has a simple configuration and reduced configuration costs.

Meanwhile, the test data can be stored in the data storage part, e.g., synchronous dynamic random access memory (SDRAM), and may be direct-memory accessed (DMA) by the video controller. Thus, various types of test images may be formed.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:
1. An image forming apparatus comprising:
a transport part which comprises a transport belt to transport a printing medium;
an image forming part which transfers a toner to form a color image; and
a controller which controls the image forming part to form a test image for color registration of the image forming part on the transport belt while an image is formed for a plurality of printing media corresponding to a single printing process, wherein the image forming part comprises:
an engine which performs an exposure process for the toner to be developed and transferred,
a video controller which generates video data based on printing data corresponding to the image being formed on the printing medium or test data corresponding to the test image: and
an engine controller which operates the engine on the basis of the video data generated by the video controller.

2. The image forming apparatus according to claim 1, wherein the engine controller comprises an auto color registration (ACR) controller which performs the color registration of the image forming part according to a result of sensing the test image.

3. The image forming apparatus according to claim 1, further comprising a data storage part which stores the test data, wherein the video controller reads out the test data stored in the data storage part through direct memory access (DMA).

4. The image forming apparatus according to claim 3, wherein the data storage part further stores the printing data.

5. An image forming apparatus comprising:
an engine which transfers a toner to form a color image;
a video controller which generates video data;
an engine controller which operates the engine according to the video data generated by the video controller; and
a controller which controls the video controller to generate video data based on one of printing data and test data by determining between performing a printing process to form an image on a printing medium and performing color registration of the engine.

6. The image forming apparatus according to claim 5, wherein the engine controller comprises an auto color registration (ACR) controller which performs the color registration of the engine according to a result of sensing a test image formed corresponding to the test data.

7. The image forming apparatus according to claim 5, further comprising a data storage part which stores the test data, wherein the video controller reads out the test data stored in the data storage part through direct memory access (DMA).

8. The image forming apparatus according to claim 7, wherein the data storage part further stores the printing data.

9. A control method of an image forming apparatus which comprises a transport part having a transport belt to transport a printing medium and an image forming part to transfer a toner to form a color image, the control method comprising:
controlling the image forming part to form an image on a first printing medium among a plurality of printing media corresponding to a single printing process;
controlling the image forming part to form a test image for color registration of the image forming part on the transport belt after forming the image for the first printing medium; and
controlling the image forming part to form an image on a second printing medium among the plurality of the printing media after forming the test image,
wherein the image forming part comprises:
an engine which performs an exposure process for the toner to be developed and transferred:
a video controller which generates video data: and
an engine controller which operates the engine according to the video data generated by the video controller, and
the controlling the image forming part to form the image on the first printing medium, the transport belt and the second printing medium comprising controlling the video controller to generate video data based on printing data or test data for color registration according to whether the image forming part performs the printing process to form the image on the printing medium or the color registration.

10. The control method of the image forming apparatus according to claim 9, wherein the engine controller comprises an auto color registration (ACR) controller which performs the color registration of the image forming part, the control method further comprising:
controlling the ACR controller to perform the color registration of the image forming part according to a result of sensing the test image.

11. The control method of the image forming apparatus according to claim 9, wherein the image forming apparatus further comprises a data storage part which stores the test data,
the controlling the image forming part to form the test image comprising controlling the video controller to read out the test data stored in the data storage part through direct memory access (DMA).

12. The control method of the image forming apparatus according to claim 11, wherein the data storage part further stores the printing data,
the controlling the image forming part to form the image on the first printing medium and the second printing medium comprising controlling the video controller to read out the printing data stored in the data storage part through direct memory access (DMA).

13. A control method of an image forming apparatus which comprises an engine to transfer a toner to form a color image, a video controller to generate video data and an engine controller to operate the engine according to the video data generated by the video controller, the control method comprising:
determining between performing a printing process to form an image on a printing medium and performing color registration of the engine; and
controlling the video controller to generate the video data based on one of printing data and test data corresponding to a result of determining between performing the printing process and performing color registration of the engine.

14. The control method of the image forming apparatus according to claim 13, wherein the engine controller comprises an auto color registration (ACR) controller which performs the color registration of the engine,
the control method further comprising controlling the auto color registration controller to perform the color registration of the engine according to a result of sensing a test image formed corresponding to the test data.

15. The control method of the image forming apparatus according to claim 13, wherein the image forming apparatus further comprises a data storage part which stores the test data,
the controlling the video controller to generate the video data comprising controlling the video controller to read out the test data stored in the data storage part through direct memory access (DMA).

16. The control method of the image forming apparatus according to claim 15, wherein the data storage part further stores the printing data,
the controlling the video controller to generate the video data comprising controlling the video controller to read out the printing data stored in the data storage part through direct memory access (DMA).

17. An image forming apparatus comprising:
an image forming part which forms a color image for a plurality of printing media; and
a controller which controls the image forming part during a printing process to form a test image for color registration after forming an image on a first printing medium and before forming another image on a second printing medium,
wherein the image forming part comprises:
an engine which performs an exposure process for a toner to be developed and transferred:
a video controller which generates video data based on printing data corresponding to the image being formed on one of the plurality of printing media or test data corresponding to the test image; and
an engine controller which operates the engine based on video data generated by the video controller.

18. The image forming apparatus according to claim 17, wherein the controller outputs a control signal to form the test image within an idle time during the printing process.

19. The image forming apparatus according to claim 17, wherein the video controller reads out the test data stored in a data storage part during the printing process.

20. The image forming apparatus according to claim 17, wherein the engine controller performs the color registration during the printing process.

21. The image forming apparatus according to claim 17, wherein the image forming part forms the test image for color registration during the first printing medium output time during the printing process.

* * * * *